(12) United States Patent
Crane

(10) Patent No.: US 7,603,702 B2
(45) Date of Patent: Oct. 13, 2009

(54) METHOD AND DEVICE FOR IDENTIFYING USER-SELECTED EQUIPMENT

(75) Inventor: Stephen James Crane, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 936 days.

(21) Appl. No.: 11/101,016

(22) Filed: Apr. 6, 2005

(65) Prior Publication Data

US 2005/0229008 A1  Oct. 13, 2005

(30) Foreign Application Priority Data

Apr. 7, 2004 (GB) .................. 0407864.8

(51) Int. Cl.
*H04L 9/32* (2006.01)
*G06F 7/04* (2006.01)

(52) U.S. Cl. .................. 726/21; 340/5.82; 340/5.83

(58) Field of Classification Search .................. 380/243
See application file for complete search history.

(56) References Cited

U.S. PATENT DOCUMENTS

| | | | |
|---|---|---|---|
| 7,284,279 B2 * | 10/2007 | Morrison et al. .............. 726/34 |
| 7,379,917 B2 * | 5/2008 | Yoshida et al. ................. 705/52 |
| 2001/0007130 A1 * | 7/2001 | Takaragi ...................... 713/186 |
| 2001/0016912 A1 * | 8/2001 | Takahashi .................... 713/200 |
| 2002/0105666 A1 | 8/2002 | Sesek ......................... 358/1.14 |
| 2004/0080777 A1 * | 4/2004 | Smith .......................... 358/1.14 |

OTHER PUBLICATIONS

Trusted Computing Platform Alliance, *TCPA PC Specific Implementaion Specification*, Version 1.00, 70 pages (Sep. 9, 2001).

* cited by examiner

*Primary Examiner*—Matthew B Smithers

(57) ABSTRACT

A method and device are disclosed for identifying an item of equipment previously selected by a user. At the time the user selects the item of equipment a reading of a biometric characteristic of the user is taken to provide first biometric data that is then stored for access only by the user-selected item. Subsequently, a user-associated device is used to contact an item of equipment and determine whether the contacted item is the user-selected item by checking whether the contacted item can provide biometric data that matches second biometric data known to correspond to the user. Preferably, the device also checks whether the contacted item of equipment is trustable. User-selectable equipment facilitating identification using biometrics is also disclosed.

19 Claims, 3 Drawing Sheets

METHOD AND DEVICE FOR IDENTIFYING USER-SELECTED EQUIPMENT

FIELD OF THE INVENTION

The present invention relates to a method and apparatus for identifying an item of equipment previously selected by a user, and to user-selectable equipment facilitating such identification.

BACKGROUND OF THE INVENTION

A common problem in modern offices is to associate a user device, such as a portable computer or a hand-held appliance, with an item of equipment, such as a printer, that it is desired to use (for example, for the input or output of data). Typically, the problem is not one of connectivity as often there are more than adequate communication means available —for example, the user device may have access to a wired or wireless network to which the equipment is connected. Instead, it is the very fact that the user device has good connectivity solutions that leads to difficulties because multiple items of equipment are contactable from the device and it becomes necessary to be able to identify which of the many contactable items of equipment the user actually wishes to use.

Factors that may affect the user's choice of what item of equipment to select include, the location of the available items, their respective capabilities, and their trustworthiness.

Existing solutions for associating a user device with a particular item of equipment include using a discrete link (such as a direct physical connection between the device and equipment or a directed infra-red or laser link), or the setting into the device of an identifier of the item of equipment to be used (such as name or the IP address of the device). This latter solution encompasses the selection of an item of equipment from a list of items available on a local network where the list is provided by a network-connected resource with which the items of equipment are registered. Other solutions for associating a user device and an item of equipment include using timed signals between the device and equipment and requiring physical intervention at the target item of equipment by the user (for example, the user may be required to press a button of the equipment).

It is an object of the present invention to facilitate the association of a user device and an item of equipment by facilitating the identification of a user-selected item of equipment from the user device.

SUMMARY OF THE INVENTION

According to one aspect of the present invention, there is provided a method of identifying an item of equipment previously selected by a user, the method comprising
 (a) reading a biometric characteristic of the user at the item of equipment selected by the user, generating corresponding first biometric data, and storing this data for access only by the user-selected item; and
 (b) establishing contact between a device associated with the user and an item of equipment and determining whether the contacted item is said user-selected item by checking, using the device or a system trusted thereby, whether the contacted item can provide biometric data that matches second biometric data known to correspond to the user.

As used herein, the term "biometric data" means any data, however measured or recorded, that represents characteristics of a biological individual intended to be unique to that individual. Thus, both digital image data of a human face and digital fingerprint data are examples of biometric data; other examples include iris, retina, and speech characteristic data. Of course, the use of biometric data to identify an individual is well known in the art.

Preferably, in (b) the device determines whether the contacted item of equipment comprises a trusted computing platform, determination of whether the contacted item is said user-selected item only being effected or only being relied upon where the contacted item is determined to comprise a trusted computing platform.

According to another aspect of the present invention, there is provided a method of associating and operating a user device with a user-selected item of equipment, the method comprising:
 reading a biometric characteristic of the user at the item of equipment selected by the user, generating corresponding first biometric data, and storing this data for access only by the user-selected item;
 establishing contact between a device associated with the user and an item of equipment and determining whether the contacted item is said user-selected item by checking, using the device or a system trusted thereby, whether the contacted item can provide biometric data that matches second biometric data known to correspond to the user;
 upon said user-selected item of equipment being identified, passing subject data at least in one direction between the device and said user-selected item during a session of usage of the equipment by the device; and
 operatively removing the first biometric data from the user-selected item after a single usage session of the user-selected item of equipment by the device.

According to a further aspect of the present invention, there is provided a device comprising:
 a memory for storing reference biometric data representative of a biometric characteristic of a user of the device;
 a communications interface for communicating with an item of equipment; and
 a determination arrangement for determining whether a said item of equipment contacted by the device via the communications interface is an item pre-selected by the user, the determination arrangement comprising:
  a first check arrangement for checking whether said item of equipment comprises a trusted computing platform, and
  a second check arrangement for checking whether biometric data possessed by said item of equipment matches said reference biometric data,
 the determination arrangement only determining the item to be one pre-selected by the user where the checks carried out by both check arrangements are successful.

According to a still further aspect of the present invention, there is provided an item of equipment comprising:
 equipment functionality;
 a communications interface for communicating with a user device;
 a biometric reader for generating biometric data corresponding to a biometric characteristic of a user when present at the equipment; and
 a trusted computing platform operatively associated with the biometric reader, the trusted computing platform comprising:
  a memory for securely storing said biometric data,
  a first arrangement for enabling the user device to check the trusted status of the platform, and a second arrangement for enabling a comparison to be made between the biometric data stored in said memory and reference biometric data possessed by the user device.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
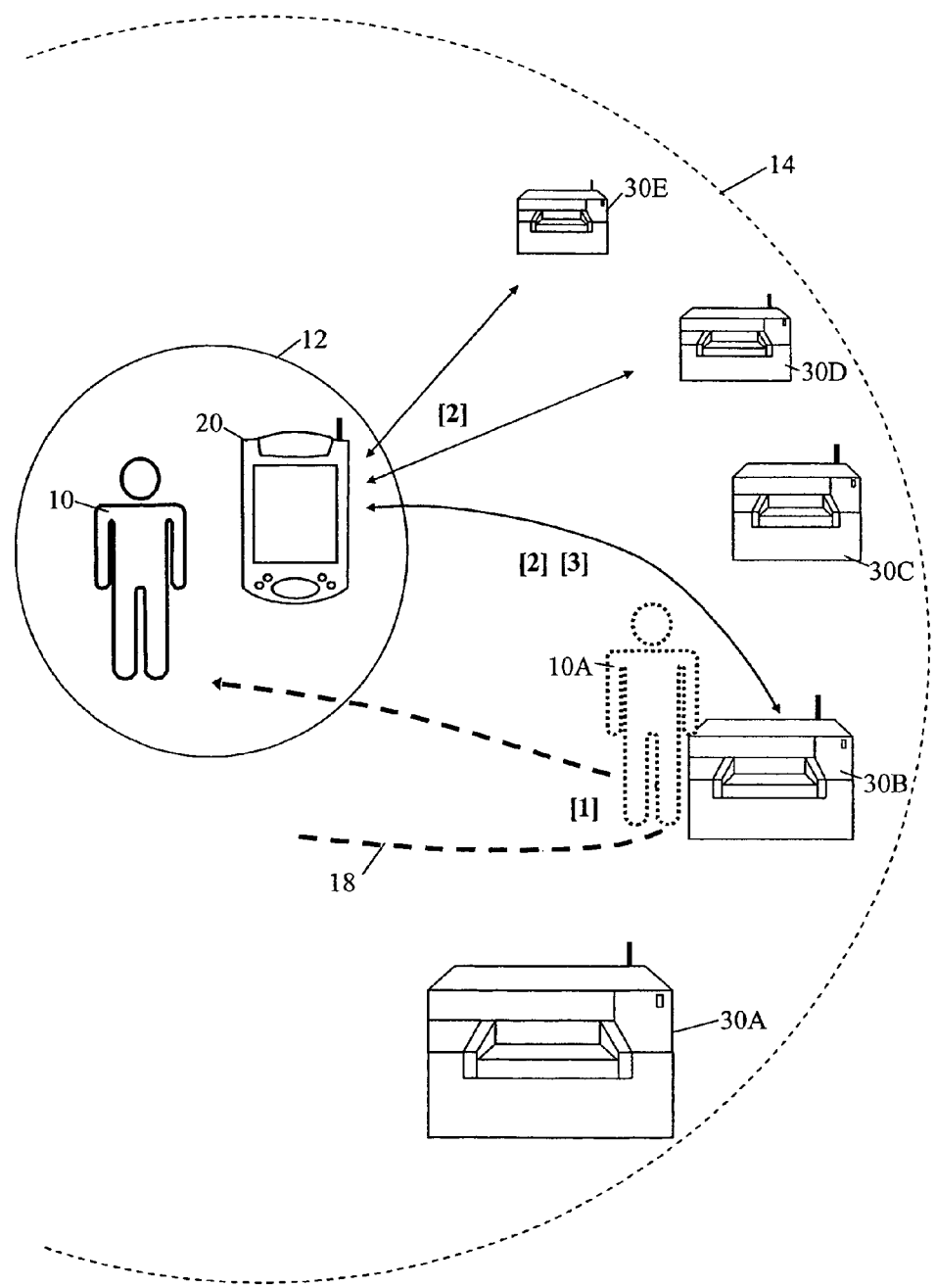
FIG. 1 is a diagram illustrating the general operation of a first embodiment of the invention.

FIG. 1 illustrates a first embodiment of the present invention in which a user 10, located in a workspace 12 in an office environment, is equipped with a user device 20 constituted in this embodiment by a hand-held personal digital assistant. The device 20 includes a short-range radio subsystem (such as a Bluetooth™ subsystem) for communicating with nearby items of equipment provided with compatible radio subsystems. The effective range of the radio subsystem is indicated by dashed arc 14 and, as can be seen, with the user positioned in workspace 12, five items of equipment 30A to 30E are within range of the device 20. These items of equipment are here shown as printers by way of example only.

The user device 20 stores, in non-volatile memory, reference biometric data representative of a biometric characteristic of the user 10. Any readable biometric characteristic can be used but, for the sake of example, it will be assumed hereinafter that the biometric characteristic represented by the reference biometric data is the user's thumbprint. The reference biometric data will typically be created off the device 20 using a thumbprint reader and the resultant biometric data then transferred to the device via an appropriate data interface. Of course, it would also be possible to equip the device 20 with a thumbprint reader to enable the device to directly generate the reference biometric data.

The reference biometric data representing the user's thumbprint can take various forms such as a set of characterising parameters or thumbprint image data.

Each of the printers 30A to 30E is equipped with a biometric characteristic reader (in the present example, a thumbprint reader) arranged to read a biometric characteristic of a person presenting themselves at the printer with the resultant biometric data being stored in the printer as user biometric data. Each printer is preferably arranged to concurrently hold multiple user biometric datas, typically from different persons; in this case the number of biometric datas that each printer need store can be limited by placing an age limit of validity on the user biometric data with data older than this limit being discarded.

Suppose now that the user 10 wishes to print data from the device 20. As already noted, five printers 30A to 30E are contactable by the device 20 from the workspace 20. In order to use a desired one of the printers, the user 10 proceeds as follows:

[1] The user 10 goes up to a selected one of the printers (as depicted in FIG. 1 by the dotted user 10A at printer 30B) and causes the printer to take a thumbprint reading from which the printer generates and stores user biometric data representative of the user's thumbprint; the user 10 then goes to workspace 10 as indicated by dashed track 18.

[2] The user 10 instructs the user device 20, via a suitable user interface, to make contact with the printer just selected by the user. The device 20 does this by contacting each item of equipment in range in turn and, after determining that the item of equipment has the desired functionality (in this case, print functionality), the device 20 asks it to provide any user biometric data it may have representing users that have selected that printer. Where a contacted printer returns user biometric data, the device 20 compares this data with the reference biometric data held by the device to determine whether the data returned by the printer matches the reference data. If no match is found between the reference data and any biometric datas provided by the currently contacted printer, the device terminates its contact with the printer (as is the case with printers 30E and 30D in FIG. 1) and contacts another one of the printers within range. However, where a match is found the device determines that it is in contact with a printer selected by the user, this being printer 30B in the FIG. 1 example; the finding of a match is preferably indicated to the user either via the user interface of the device 20 or via the user interface of the printer concerned.

[3] The device 20 now sends the data to be printed to the printer identified as one selected by the user 10.

In the foregoing process of identifying a printer selected by the user, rather than the device ending its search upon such a printer being identified, the device can be arranged to note the identity of that printer and then proceed to complete contacting all printers in range (in the case of the FIG. 1 example, this would involve contacting printers 30A and 30C). This enables the device 30 to identify all printers in range that have been selected by the user where the user has pre-selected more than one printer; in this case, the final choice of printer to use is either made by the user 10 on the basis of printer characteristics presented to the user by the device or automatically by the device 20 according to predetermined criteria.

In the foregoing embodiment it was assumed that the printers and the environment were trustable to operate honestly. However, in many situations it will not be possible simply to assume that the printers (or other items of equipment) are trustable or that the environment is secure. Accordingly, in the second embodiment shown in FIG. 2, trusted computing technology is used to enable the user device to determine whether the items of equipment it contacts can be trusted.

Apart from the addition of trusted computing technology, the second embodiment is generally similar to the first embodiment and comprises a user device 20 and one or more items of equipment 30. More particularly, the user device 20 comprises a communications interface 21 (for example, a radio subsystem) for communicating with the equipment 30, a user interface 22 for interacting with the user, a control block 23 typically built around a program-controlled general purpose processor, and a non-volatile memory 24 for holding reference biometric data (in the present case, thumbprint data) characteristic of the device user and set into the memory 24 in any appropriate manner as already described with reference to the first embodiment. The item of equipment 30 comprises a communications interface 31 compatible with the interface 21 of the user device 20, equipment functionality (in the present example, printing functionality), a thumbprint reader 34 and a trusted computing platform 35 including a program-controlled processor for controlling equipment operation including the execution of certain trusted processes described below. The thumbprint reader 34 and the trusted computing platform 35 constitute trusted components of the item 30 and are tamper resistant.

The trusted computing platform 35 is provided with trusted functions, verifiable hardware/software configuration, protected storage and related functions, such as described in the book "trusted computing platforms—tcpa technology in context"; Pearson (editor); Prentice Hall; ISBN 0-13-009220-7". Other forms of trusted platform can alternatively be used as will be apparent to persons skilled in the art; however, for the purposes of illustration, the trusted computing platform 35 will hereinafter be taken to conform to the TCPA architecture described in the above-referenced book. Accordingly, a brief outline of the relevant features of a TCPA platform will next be given.

A TCPA trusted platform incorporates a trusted platform subsystem typically comprising a Trusted Platform Module (TPM) in the form of a hardware chip separate from the main processor, a Root of Trust for Measurement (RTM) formed by the first software to run during the boot process, and support software termed the Trusted platform Support Service (TSS) which performs various functions such as those necessary for communication with the rest of the platform. The RTM and associated measurement agents carry out integrity measurements (integrity metrics) on the platform at various stages and store the results in a measurement log in ordinary memory; however, a condensed summary is also stored in Platform Configuration Registers (PCRs) of the TPM.

In addition to the PCRs, the TPM comprises a processor and various cryptographic functions as well as memory for permanently holding secrets such as the private TPM endorsement key and the storage root key (SRK). With regard to the SRK, the TPM supports a Protected Storage mechanism in the form of a hierarchy (tree) of data objects the root of which is the SRK; apart from the SRK that is permanently stored in the TPM (and not released from it), the tree can be stored outside of the TPM. When information in a node is used or revealed, the node is manipulated by the TPM. Each intermediate node object in the tree is encrypted by a key in the node object above it in the tree (the parent node), all the way back to the SRK root node. Intermediate nodes in the tree are keys but leaf nodes can be arbitrary data (though frequently they will also be keys, such as symmetric keys for use by application processes in protecting bulk data).

Access to keys in the key hierarchy (and thus to the data protected by the keys) can be made dependent on the current state of the platform as indicated by the values held in the PCRs. The relevant TCPA functions are TPM_Seal and TPM_Extend which enable a TPM to conceal nodes unless the value of current PCR is the same as stored PCR values. This sealing process ("Seal") enables enforcement of the software environment (PCRs) that must exist before data can be revealed, and simultaneously provides a method of concealing data (because the TPM releases a decryption key) until that environment exists. Seal is therefore an access control that depends on the previous state(s) of a platform (represented in terms of PCRs). Seal permits the creator of data to dictate the software environment that must exist in a platform when the data is used.

A TCPA trusted platform also includes functionality enabling a remote entity to check the trusted platform status of the platform and to securely interface with the platform, for example, to store keys and data in Protected Storage for unsealing only when the PCRs hold values corresponding to the running of a particular process (such as one provided by the remote entity) in a benign,—that is, non subversive— environment.

Figure 2:
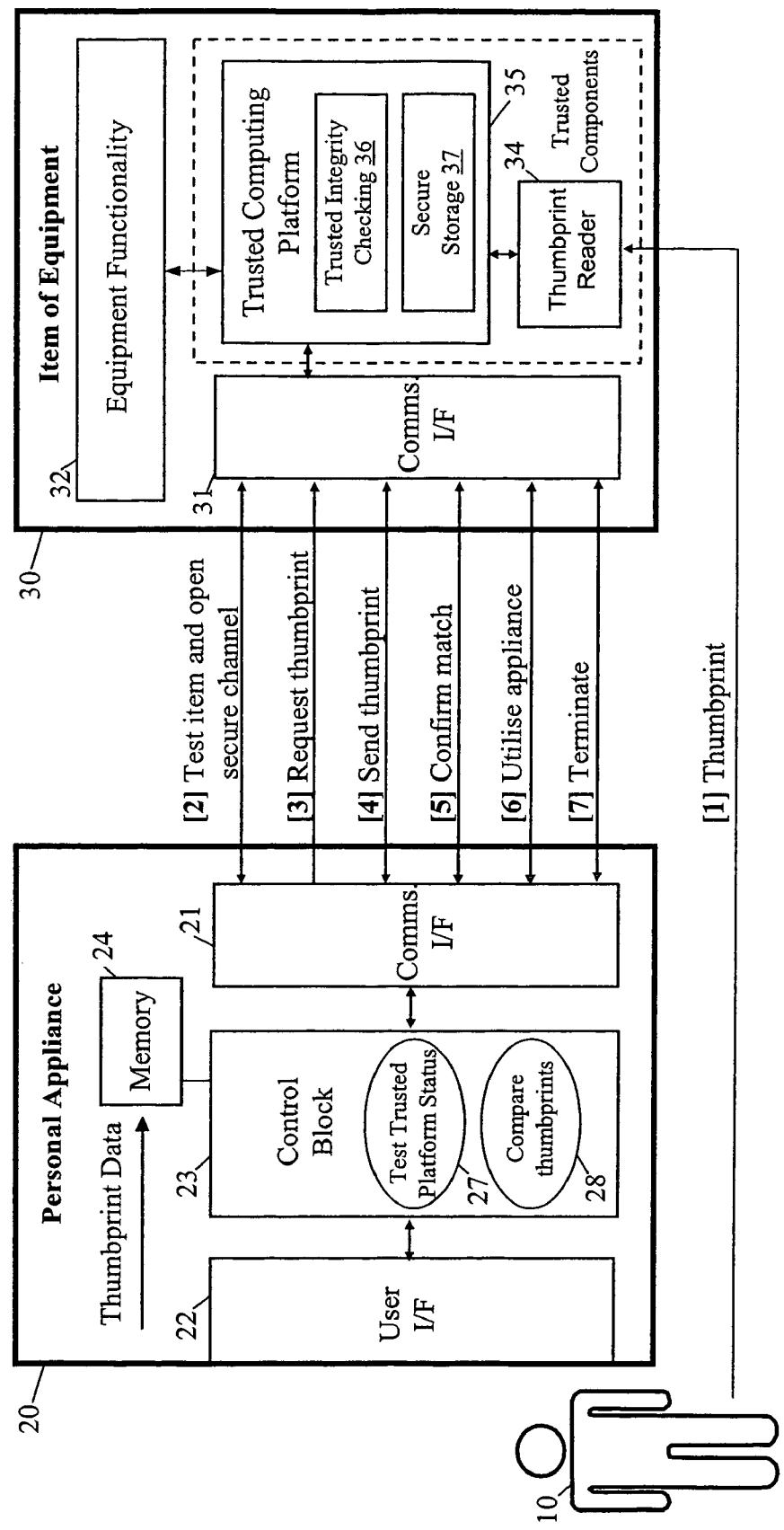
FIG. 2 is a diagram illustrating the operation of a second embodiment of the invention.
Figure 3:
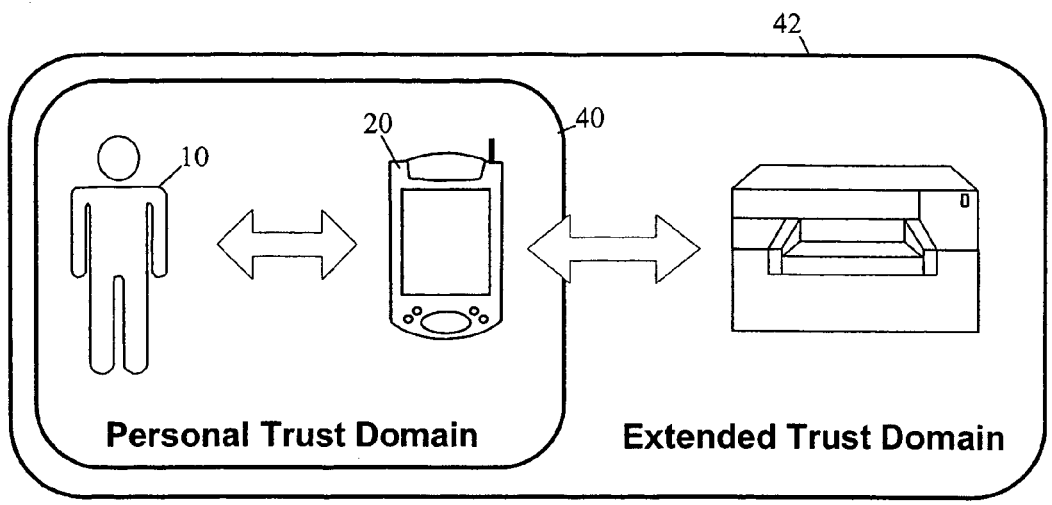
FIG. 3 is a diagram depicting an extended trust domain effectively created by use of the FIG. 2 embodiment.

Returning more specifically to the trusted computing platform 35 of FIG. 2, two particular functional components of the trusted computing platform 35 are shown, these being a trusted integrity checking module 36 and a secure storage module 37. The integrity checking module 36 represents the above-mentioned TCPA functionality for enabling a remote entity, in this case the user device 20, to check the trusted platform status of the entity 35. The secure storage module 37 is embodied as TCPA Protected Storage and holds the user biometric data read by the thumbprint reader 34. The writing of user biometric data to Protected Storage is arranged only to be possible if the current PCR values indicate that the process being run for generating and storing this data is an approved process executing in a benign environment. In addition, the retrieval of the user biometric data for sending to the user device 20 in a secure manner is arranged only to be possible if the current PCR values indicate that the process being run for securely transmitting the data to the user device 20 is an approved process executing in a benign environment.

The above-described form of trusted computing platform 35 enables the user device 20 to assure itself that the equipment 30 can be trusted to supply genuine user biometric data generated by itself. This is achieved by the user device 30 running a process 27 to interact with the trusted integrity checking module 36 of the platform 35 PTA in order to confirm that the platform is based on trusted (in this example, TCPA) technology and is arranged to store and retrieve user biometric data using approved processes running in a benign operating environment as indicated by the particular PCR values required to be present for access to the corresponding area of Protected Storage. Furthermore, by arranging for the process used to retrieve the user biometric data from Protected Storage, only to send the data to the user device over a secure communications channel (with user authentication being a possible requirement), the user biometric data can be made be secure against interception and tampering during transmission.

Thus, the overall identification process between the user device 20 and the item of equipment 30 proceeds as follows:

[1] The user 10 selects the item of equipment 30 by placing their thumb on thumbprint reader 34 thereby causing corresponding user biometric data to be generated and stored in secure storage 37 (Protected Storage).

[2] The user device 20 contacts the item of equipment 30 and, after checking that the equipment has the desired functionality, the device 20 runs process 27 to check that the equipment is trustable, that is, that the equipment comprises a trusted computing platform with approved processes for handling user biometric data. A secure channel is also set up between the user device and item of equipment 30. If the contacted equipment cannot prove it is trustworthy, the user device terminates contact; otherwise, the identification process proceeds.

[3] The user device 20 requests user biometric data from the item of equipment 30.

[4] The item of equipment sends the or each user biometric data over the secure communication channel to the user device 20.

[5] The user device runs a process 28 to compare the or each received user biometric data with the reference biometric data held in memory 24. It will be appreciated that this matching process can be arranged to specify that a match has occurred even though there is less than a 100% match between the user biometric data and the reference biometric data. The result of this process (match/no match) is returned to the equipment 30 and is indicated to the user via the user interface 22. If no match was found, contact between the user device and equipment is terminated.

[6] If a match was found, the user device 20 proceeds to use the equipment 30 with or without user intervention. The use of the equipment will involve the passing of subject data at least in one direction between the device 20 and equipment 30. For example, where the equipment 30 is a printer, subject data to be printed will be passed from the device 20 to the equipment; where the equipment is a document scanner, scanned-in subject data will be passed from the equipment to the device 20; where the equipment is image-processing apparatus, subject data in the form of an image is passed from the device to the equipment and, subsequently, processed image data is returned to the device from the equipment.

[7] Upon completion of the session of usage of the equipment 30, contact between the user device 20 and the equipment is terminated. The equipment 30 can be arranged to retain the user biometric data that gave rise to a match in [5] or this user biometric data can be deleted (or made unavailable for passing to the device 20) effectively treating the generation of this data as authorisation for a single usage session only. Where the user biometric data is retained, the reference biometric data from the user device 20 can be substituted for it to ensure a 100% match between the two in any subsequent comparison; furthermore, where a time of generation of the user biometric data is stored along with the latter, this time of generation can be reset to the time of termination of the utilisation of the equipment 30 by the user device 20.

Whilst, as described above, the user device 20 will typically be arranged to terminate contact with an item of equipment that cannot show itself to be trustable, it is also possible to arrange for contact to continue to enable the biometric data matching operation to be carried out; if a match is found, the user is informed both of the match and of the non-trusted status of the equipment—it is then left to the user to determine whether they wish to use the equipment concerned.

As with the FIG. 1 embodiment, there will typically be multiple items of equipment contactable by the device 30 and the device 30 is arranged to contact each item in turn until an item of equipment is identified that is both trustable (as checked by process 27) and has user biometric data which matches the user biometric data (as checked by process 28). Furthermore, and again as with the FIG. 1 embodiment, rather than the device 20 of the FIG. 2 embodiment ending its search upon a contacted item passing both checks, the device can be arranged to note the identity of that item and then proceed to complete contacting all items in range to determine if any other items also pass both checks.

In the first embodiment described above with respect to FIG. 1, each printer 30A to 30E preferably applied an age limit to the user biometric datas it stored so that only the most recent datas were kept. This arrangement can also be used in respect of the second embodiment shown in FIG. 2. Furthermore, in addition or alternatively to the age-limit arrangement, the time of generation of each user biometric data can be recorded and passed to the user device 20 along with the user biometric data; this time of generation is then presented to the user upon a match being found between the reference biometric data and the user biometric data in order to enable the user to make a judgement as to the plausibility of the presented time (that is, does the time correspond at least approximately to when the user thought he/she had made the item selection?) and to reject the match if the presented time does not seem likely to be correct. This arrangement can, of course, also be provided in respect of the first embodiment.

One way of considering the effect of the FIG. 2 embodiment is to view the identification of a trustworthy user-selected item of equipment 30 by the device 30 as effectively extending the personal trust domain 40 that exists between a user 10 and their device 20 to encompass the identified item 30, thereby forming an extended trust domain 42.

Because the device 20 can check that the equipment 30 has been selected by the user and provides a benign operating environment for running approved processes, it can treat the equipment as an extension of itself. Thus, where the equipment 30 is connected to a network and is contactable by a remote third-party entity, the equipment 30 and device 20 can cooperate to authenticate the equipment to the third-party entity as if it were the device 20. Preferably this is done by the device 20 being asked by the equipment 30 to provide it with the required authentication responses for replying to an authentication challenge made by the remote entity. However it is also possible for the device 20 to provide the equipment 30 with the user/device related security parameters needed for the equipment to carry out tasks, such as the generation of authentication responses, normally performed by the device 20. Of course, where the equipment is provided with such security parameters, the device must first assure itself that these parameters will only be used by approved (trusted) processes and, preferably, will be deleted after use (since the operative association of the device 20 and equipment 30 will generally only be short-lived).

As an alternative to arranging for the trusted user-selected item of equipment 30 to masquerade as the device 20 for interaction with a third-party entity, the device 20 can contact the third-party 20 to pass it, in a secure manner, identification details of the equipment 30 with instructions that the equipment can be trusted in respect of a certain task (such as receiving information for printing in the next five minutes). The identification details preferably include the public key of a public/private key pair associated with the equipment 30 whereby to enable the third-party entity to authenticate the equipment upon contacting it.

Figure 4:
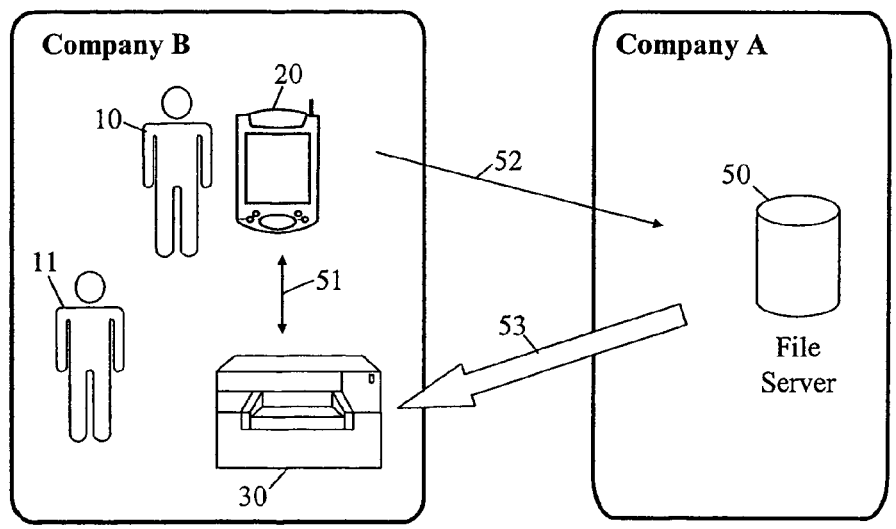
FIG. 4 is a diagram illustrating an example usage scenario of the FIG. 2 embodiment.

FIG. 4 illustrates an example usage of the FIG. 2 embodiment. In this case the user 10 is an employee of company A and is visiting person 11 at company B. User 10 has his trusted device 20 with him. During the course of discussions, user 10 realises that he does not have all the information with him needed to advance the discussion; the information is, however, available on a server 50 back in company A. The user 10 decides to have the information printed out locally at company B. To do this, the user 10 uses the method described above with respect to FIG. 2 to select a printer 30 and then identify it from his device 20 after the device has checked that the printer 30 is trustworthy (arrow 51 in FIG. 4). Next, the user 10 uses his device 20 to send a secure message (arrow 52) to the server 50 in company A asking it to send the required information to printer 30; the secure message sent by device 20 includes data enabling the server 50 to contact the printer 30 and the public key of a public/private key pair associated with the equipment 30. The server 50 then contacts the printer 30, authenticates the printer, and passes it the information to be printed (arrow 53). The printer then prints out the required information.

It will be appreciated that many variants are possible to the above described embodiments of the invention. For example, although in the described embodiments the user biometric data is stored in the equipment 30, it is alternatively possible to arrange for this data to be stored off the equipment in, for example, a network connected resource for access only by the equipment; such an arrangement could be used, for example, where the raw data produced by the biometric reader at the equipment needs substantial processing to produce the user biometric data so that the processing is best done by a specialised network-connected resource that can then also serve to store the data.

The reference biometric data used by the device 20 can similarly be stored off the device 20 and only retrieved by the latter as needed, preferably over a secure connection. It is also possible to arrange for the reference biometric data to be generated directly by a biometric reader of the device at the time it is needed for comparison with the equipment-provided biometric data.

The communication between device and equipment can take any suitable form including a wireless LAN or wired network. Furthermore, whilst the device 20 is preferably portable, this will not be required in some applications.

The comparison of the reference biometric data with the user biometric data provided by a contacted item of equipment, need not be carried out by the device 20 itself but can be effected on its behalf by a system trusted by the device. This trusted system can be the contacted item after its trust status has been confirmed, or another entity.

In order to avoid the user initially selecting, in step [1] of FIG. 2, an item of equipment that is not trustable, the device 20 can be arranged to carry out a preliminary step of contacting items of equipment and, for each such item, determining whether the item meets a set of one or more conditions comprising at least the condition that the item comprises a trusted computing platform; if the set of conditions is met, the device causes the item to display a user-discernible indication. A further condition of the set of conditions is, for example, that the item has particular functionality.

The invention claimed is:

1. A method of identifying an item of equipment previously selected by a user, the method comprising:
   (a) reading a biometric characteristic of the user at the item of equipment selected by the user from among a plurality of items of equipment, generating corresponding first biometric data, and storing this data for access only by the user-selected item; and
   (b) establishing contact between a device associated with the user and the user-selected item of equipment by contacting a series of the items of equipment and for each item contacted, determining whether the contacted item is said user-selected item by checking, using the device or a system trusted thereby, whether the contacted item can provide biometric data that matches second biometric data known to correspond to the user.

2. A method according to claim 1, wherein contacting the series of the items of equipment comprises contacting each item from the plurality of items of equipment in turn at least until a contacted item of equipment is determined to be said user-selected item.

3. A method according to claim 1, wherein in (b) for each of the contacted items of equipment, a secure communications channel is established between the device and said item of equipment, and biometric data is transferred over this channel to enable the said checking for a biometric data match to be carried out.

4. A method according to claim 1, wherein in (b) the device determines whether the contacted item of equipment comprises a trusted computing platform, determination of whether the contacted item is said user-selected item only being effected or only being relied upon where the contacted item is determined to comprise a trusted computing platform.

5. A method according to claim 4, wherein the determination of whether the contacted item of equipment is said user-selected item is carried out by the contacted item acting as said system trusted by the device.

6. A method according to claim 1, wherein the first biometric data is only treated as valid for a predetermined period after its generation.

7. A method according to claim 1, wherein the time of generation of the first biometric data is recorded in (a) and is provided to the device in (b) and presented to the user to enable the user to decide whether to treat the first biometric data as reliable.

8. A method according to claim 1, wherein contacting the series of the items of equipment comprises the device contacting any available items of equipment and for each such item:
   determining whether the item meets a set of one or more conditions comprising at least the condition that the item comprises a trusted computing platform, and
   where said set of conditions is met, causing the item to display a user-discernible indication.

9. A method according to claim 1, wherein in (a) the first biometric data is stored in said user-selected item of equipment.

10. A method according to claim 1, wherein the second biometric data is stored in said device.

11. A method of associating and operating a user device with a user-selected item of equipment, the method comprising:
   reading a biometric characteristic of the user at the item of equipment selected by the user, generating corresponding first biometric data, and storing this data for access only by the user-selected item;
   establishing contact between a device associated with the user and an item of equipment and determining whether the contacted item is said user-selected item by checking, using the device or a system trusted thereby, whether the contacted item can provide biometric data that matches second biometric data known to correspond to the user;
   upon said user-selected item of equipment being identified, passing subject data at least in one direction between the device and said user-selected item during a session of usage of the equipment by the device; and
   operatively removing the first biometric data from the user-selected item after a single usage session of the user-selected item of equipment by the device.

12. A method according to claim 11, farther comprising repeating the step of establishing contact between the device associated with the user and a next item of equipment available and determining whether the item being contacted can provide biometric data that matches the second biometric data, the user-selected item being identified as an item able to provide biometric data that matches the second biometric.

13. A device comprising:
   a memory for storing reference biometric data representative of a biometric characteristic of a user of the device;
   a communications interface for communicating with items of equipment; and
   a determination arrangement for determining whether an item of equipment contacted by the device via the communications interface is an item pre-selected by the user, the determination arrangement comprising:

a first check arrangement for checking whether the contacted item of equipment comprises a trusted computing platform, and a second check arrangement for checking whether biometric data possessed by the contacted item of equipment matches said reference biometric data, the determination arrangement only determining the contacted item to be one pre-selected by the user where the checks carried out by both check arrangements are successful.

14. A device according to claim 13, wherein the second check arrangement is arranged to receive from said item of equipment the biometric data possessed thereby and to seek to match this data with the reference biometric data.

15. A device according to claim 13, wherein the second check arrangement is arranged to receive from said item of equipment the biometric data possessed thereby, to pass this data together with said reference biometric data to an external system for the latter to determine whether the biometric datas match, and to receive back a response from the external system indicative of whether a match was found.

16. A device according to claim 13, wherein the second check arrangement is arranged, upon the first check arrangement determining that the said item of equipment comprises a trusted platform, to pass said reference biometric data to the item of equipment for the latter to determine whether this data matches the biometric data possessed by the item of equipment, and to receive back a response from the item of equipment indicative of whether a match was found.

17. A device according to claim 13, further comprising a time-indication arrangement for receiving from said item an indication of the time of generation of the biometric data possessed by the item, and for outputting this indication to the user.

18. A device according to claim 13, further comprising a secure communications arrangement for securely passing device-related security data from the device, via the communications interface, to said item of equipment after the latter has been determined to be an item pre-selected by the user, said device-related security data being such as to enable the item of equipment to operate as if it were said device for the purpose of receiving and utilising data provided to it from another entity.

19. An item of equipment comprising:

equipment functionality;

a communications interface for communicating with a user device;

a biometric reader for generating biometric data corresponding to a biometric characteristic of a user when present at the equipment; and a trusted computing platform operatively associated with the biometric reader, the trusted computing platform comprising:

a memory for securely storing said biometric data, a first arrangement for enabling the user device to check the trusted status of the platform, a second arrangement for enabling a comparison to be made between the biometric data stored in said memory and reference biometric data possessed by the user device, and a third arrangement for enabling the trusted computing platform to indicate to the user device whether the biometric data stored in said memory matches reference biometric data possessed by the user device.

* * * * *